United States Patent
Elkovitch et al.

(10) Patent No.: US 7,182,886 B2
(45) Date of Patent: *Feb. 27, 2007

(54) POLY (ARYLENE ETHER)/POLYAMIDE COMPOSITION

(75) Inventors: Mark D. Elkovitch, Delmar, NY (US); James Ross Fishburn, Slingerlands, NY (US); Sai-Pei Ting, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/903,362

(22) Filed: Jul. 30, 2004

(65) Prior Publication Data

US 2005/0038203 A1    Feb. 17, 2005

Related U.S. Application Data

(60) Provisional application No. 60/495,357, filed on Aug. 16, 2003.

(51) Int. Cl.
*C08L 77/00* (2006.01)

(52) U.S. Cl. ............... 252/500; 524/504; 524/505; 524/508; 524/514; 525/66; 525/92 B; 525/183; 525/391; 525/397

(58) Field of Classification Search ........... 525/66, 525/92 B, 133, 391, 397; 524/504, 505, 524/508, 514, 538; 252/500, 510
See application file for complete search history.

(56) References Cited

U.S. PATENT DOCUMENTS

| | | | |
|---|---|---|---|
| 4,315,086 A | 2/1982 | Uenon et al. |
| 4,600,741 A | 7/1986 | Aycock et al. |
| 4,659,760 A | 4/1987 | Van der Meer |
| 4,732,938 A | 3/1988 | Grant et al. |
| 4,745,157 A | 5/1988 | Yates, III et al. |
| 4,772,664 A | 9/1988 | Ueda et al. |
| 4,798,865 A | 1/1989 | Grant et al. |
| 4,808,671 A | 2/1989 | Sivavec |
| 4,826,933 A | 5/1989 | Grant et al. |
| 4,859,739 A | 8/1989 | Yates, III et al. |
| 4,863,966 A | 9/1989 | Black et al. |
| 4,863,996 A | 9/1989 | Nakazima et al. |
| 4,873,276 A | 10/1989 | Fujii et al. |
| 4,873,286 A | 10/1989 | Gallucci et al. |
| 4,874,810 A | 10/1989 | Lee, Jr. et al. |
| 4,923,924 A | 5/1990 | Grant et al. |
| 4,929,675 A | 5/1990 | Abe et al. |
| 4,957,966 A | 9/1990 | Nishio et al. |
| 4,960,825 A | 10/1990 | Van der Meer |
| 4,963,620 A | 10/1990 | Grant et al. |
| 4,994,525 A | 2/1991 | Brown et al. |
| 4,997,612 A | 3/1991 | Gianchandai et al. |
| 5,000,897 A | 3/1991 | Chambers |
| 5,059,646 A | 10/1991 | Morioka et al. |
| 5,086,105 A | 2/1992 | Abe et al. |
| 5,104,937 A | 4/1992 | Saito et al. |
| 5,104,939 A | 4/1992 | Van der Meer et al. |
| 5,109,052 A | 4/1992 | Kasai et al. |
| 5,109,065 A | 4/1992 | Saito et al. |
| 5,122,576 A | 6/1992 | White et al. |
| 5,132,365 A | 7/1992 | Gallucci |
| 5,134,196 A | 7/1992 | Van der Meer |
| 5,135,983 A | 8/1992 | Morioka |
| 5,162,433 A | 11/1992 | Nishio et al. |
| 5,237,002 A | 8/1993 | Nishio et al. |
| 5,248,728 A | 9/1993 | Lee, Jr. |
| 5,260,359 A | 11/1993 | Muehlbach et al. |
| 5,260,374 A | 11/1993 | Gallucci |
| 5,288,786 A | 2/1994 | Nishio et al. |
| 5,296,533 A | 3/1994 | Nagaoka et al. |
| 5,304,593 A | 4/1994 | Nishio et al. |
| 5,310,821 A | 5/1994 | Kodaira et al. |
| 5,324,782 A | 6/1994 | Lee, Jr. |
| 5,334,636 A | 8/1994 | Fujii et al. |
| 5,397,838 A | 3/1995 | Ohtomo et al. |
| 5,403,888 A | 4/1995 | Nishio et al. |
| 5,405,902 A | 4/1995 | Nishio et al. |
| 5,470,902 A | 11/1995 | Kubo et al. |
| 5,470,913 A | 11/1995 | Van der Meer et al. |
| 5,475,049 A | 12/1995 | Ohtomo et al. |
| 5,506,305 A | 4/1996 | Nagaoka et al. |

(Continued)

FOREIGN PATENT DOCUMENTS

EP    1 024 171    1/2000

(Continued)

OTHER PUBLICATIONS

JP2004-083792. Application Date 2004-083792 (Machine Translation).

(Continued)

*Primary Examiner*—Ana Woodward
(74) *Attorney, Agent, or Firm*—Cantor Colburn LLP

(57) ABSTRACT

A composition comprises an impact modifier and a compatibilized blend of a poly(arylene ether) and an aliphatic-aromatic polyamide. The polyamide is composed of dicarboxylic acid units comprising 60 to 100 mol % of terephthalic acid units and diamine units comprising 60 to 100 mol % of 1,9-nonanediamine units and/or 2-methyl-1, 8-octanediamine units. The polyamide has an amine end group content greater than 45 micromoles per gram of polyamide.

22 Claims, 6 Drawing Sheets

U.S. PATENT DOCUMENTS

| | | | |
|---|---|---|---|
| 5,521,244 | A | 5/1996 | Yates et al. |
| 5,554,693 | A | 9/1996 | Ohtomo et al. |
| RE35,509 | E * | 5/1997 | Fujii et al. |
| 5,719,233 | A | 2/1998 | Gallucci et al. |
| 5,723,539 | A | 3/1998 | Gallucci et al. |
| 5,741,846 | A | 4/1998 | Lohmeijer et al. |
| 5,760,125 | A | 6/1998 | Ohtomo et al. |
| 5,859,130 | A | 1/1999 | Gianchandai et al. |
| 5,859,176 | A | 1/1999 | Nakahashi et al. |
| 5,916,970 | A | 6/1999 | Lee, Jr. et al. |
| 5,977,240 | A | 11/1999 | Lohmeijer et al. |
| 6,171,523 | B1 | 1/2001 | Silvi et al. |
| 6,180,716 | B1 | 1/2001 | Majumdar |
| 6,319,986 | B1 | 11/2001 | Amimoto et al. |
| 6,362,263 | B1 * | 3/2002 | Brown et al. ............... 524/267 |
| 2003/0023008 | A1 | 1/2003 | Uchida et al. |
| 2003/0088027 | A1 | 5/2003 | Chin et al. |
| 2004/0034152 | A1 | 2/2004 | Oka et al. |

FOREIGN PATENT DOCUMENTS

| | | | |
|---|---|---|---|
| EP | 1170335 | | 7/2001 |
| EP | 1375578 | | 6/2003 |
| JP | 405339496 | | 12/1993 |
| JP | 2000-212434 | * | 8/2000 |

OTHER PUBLICATIONS

JP2000-212433. Publication Date: Feb. 8, 2000 (Machine Translation).

JP2000-212484. Publication Date: Feb. 8, 2000 (Machine Translation).

JP2003 041117. Feb. 13, 2003 Abstract Only.

ASTM D 570-98 "Standard Test Method for Water Absorption of Plastics". pp. 1-4.

ASTM D 256-04 "Standard Test Methods for Determining the Izod Pendulum Impact Resistance of Plastics". pp. 1-20.

ASTM D 3763-02 "Standard Test Method for High Speed Puncture Properties of Plastics Using Load and Displacement Sensors" pp. 1-10.

UL94 "Test for Flammability of Plastic Materials for Parts in Devices and Appliances" Fifth Edition Dated Oct. 29, 1996.

JP2004-083792. Publication Date Mar. 18, 2004. (Manual Translation).

JP1997087483A. Publication Date. Mar. 31, 1997 (Manual Translation).

JP2000-212433. Publication Date Aug. 2, 2000. Manual Translation.

JP2000-212434. Publication Date Aug. 2, 2000. Manual Translation.

International Search Report mailed on Dec. 8, 2004. International Application No. PCT/US2004/026587.

International Search Report mailed on Dec. 8, 2004. International Application No. PCT/US2004/026580.

* cited by examiner

POLY (ARYLENE ETHER)/POLYAMIDE COMPOSITION

CROSS REFERENCE TO RELATED APPLICATIONS

This application claims priority to U.S. Provisional Application No. 60/495,357 filed on Aug. 16, 2003, which is incorporated by reference herein.

BACKGROUND OF INVENTION

The disclosure relates to poly(arylene ether)/polyamide compositions.

Poly(arylene ether)/aliphatic polyamide compositions are widely used and the characteristics of the compositions are a result of, at least in part, the characteristics of the poly (arylene ether) and the polyamide. Despite their wide use compositions employing aliphatic polyamides can suffer from drawbacks such as undesirably low dimensional stability, and high moisture absorption. Attempts have been made to improve the physical property profile by altering the polyamide structure to include aromatic elements. Compositions employing these aliphatic-aromatic polyamides have improved many physical properties such as heat resistance, dimensional stability and water absorption but have diminished other desirable properties. For instance, many aliphatic-aromatic polyamides have melt temperatures above the degradation temperature of many polymers. Thus these aliphatic-aromatic polyamides cannot be blended with many polymers without causing at least partial degradation of the polymer. Some aliphatic-aromatic polyamides have a melt temperature less than the degradation temperature of many polymers but these polyamides usually have inadequate dimensional stability for most applications and blends employing them typically demonstrate poor dimensional stability as well.

Additionally, poly(arylene ether)/polyamide compositions typically have at least two immiscible phases and the physical properties of the composition can be affected by the morphology of the phases. For instance, a poly(arylene ether)/polyamide composition may have dimensional stability in the flow direction that is not the same as the dimensional stability in the non-flow direction. However, the morphology of the phases can be difficult to control and methods of controlling it can vary depending on the polyamide.

Accordingly there is a need for a poly(arylene ether)/aliphatic-aromatic polyamide composition having a combination of high heat resistance, processability, comparable dimensional stability in the flow and non-flow directions in the absence of filler and low water absorption.

BRIEF DESCRIPTION OF THE INVENTION

The above mentioned need is addressed by a composition comprising an impact modifier and a compatibilized blend of a poly(arylene ether) and an aliphatic-aromatic polyamide. The polyamide is composed of dicarboxylic acid units comprising 60 to 100 mol % of terephthalic acid units and diamine units comprising 60 to 100 mol % of 1,9-nonanediamine units and/or 2-methyl-1,8-octanediamine units. The polyamide has an amine end group content greater than 45 micromoles per gram of polyamide. When the composition is formed into an article the poly(arylene ether) is dispersed in the polyamide as particles and the poly(arylene ether) particles have an average particle area less than and equal to 0.6 square micrometers.

In another embodiment, a composition comprises an impact modifier; and a compatibilized blend of a poly (arylene ether) and an aliphatic-aromatic polyamide wherein the aliphatic-aromatic polyamide is composed of dicarboxylic acid units comprising 60 to 100 mol % of terephthalic acid units and diamine units comprising 60 to 100 mol % of 1,9-nonanediamine units and/or 2-methyl-1,8-octanediamine units and the aliphatic-aromatic polyamide has an amine end group content greater than 45 micromoles per gram of polyamide and further wherein the composition, in the absence of filler and/or reinforcing agent, has a multiaxial loss less than or equal to 0.30 determined using multi-axial values measured according to ASTM D 3763.

DETAILED DESCRIPTION

Figure 1:
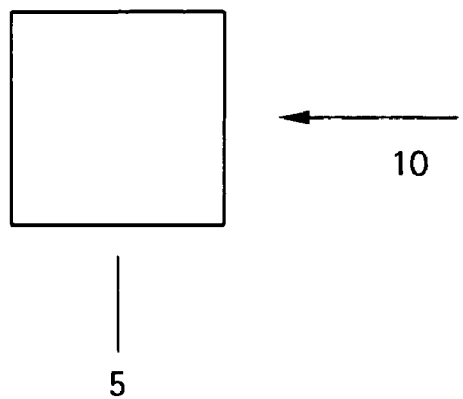
FIG. 1 is a schematic representation of a section for transmission electron microscopy.

The composition disclosed herein comprises a compatibilized blend of poly(arylene ether) and an aliphatic-aromatic polyamide as well as an impact modifier. The polyamide comprises dicarboxylic acid units and diamine units. At least 60 mol % of the dicarboxylic acid units are terephthalic acid units and at least 60 mol % of the diamine units are 1,9-nonanediamine units and/or 2-methyl-1,8-octanediamine units. The combination of aromatic units and nine carbon aliphatic units results in a polyamide having a unique combination of melt temperature, low water absorption, and dimensional stability, which, when employed in a poly(arylene ether)/polyamide blend, results in a composition having excellent dimensional stability, impact strength and water absorption. Surprisingly however, morphological control of the compatibilized poly(arylene ether)/aliphatic-aromatic polyamide blend differs from morphological control of compatibilized poly(arylene ether)/aliphatic polyamide blends.

Remarkably it has been found that the size and distribution of the poly(arylene ether) phase is related to the type of compatibilizing agent, the quantity of amine end groups present in the polyamide and in some cases the method of compatibilization. The compatibilized poly(arylene ether)/polyamide blend described herein has a desirable combination of physical properties including good dimensional stability as evidenced by a low coefficient of thermal expansion (CTE), low water absorption, and high impact resistance—even at low temperatures.

In one embodiment the composition, in the absence of filler and/or reinforcing agents, has a coefficient of thermal expansion (CTE) of $6 \times 10^{-5}$ millimeters/millimeters ° C. to $9 \times 10^{-5}$ millimeters/millimeters ° C. as determined by ISO 11359-2 and reported at 23–60° C. Within this range the CTE may be greater than or equal to $6.2 \times 10^{-5}$ millimeters/millimeters ° C., or, more specifically, greater than or equal to $6.4 \times 10^{-5}$ millimeters/millimeters ° C. Also within this range the CTE may be less than or equal to $8.7 \times 10^{-5}$ millimeters/millimeters ° C., or, more specifically less than or equal to $8.5 \times 10^{-5}$ millimeters/millimeters ° C. Notably the composition comprising an impact modifier and poly (arylene ether)/aliphatic-aromatic polyamide has a CTE that remains substantially constant over a wider temperature range (15–100° C.) than comparable compositions comprising poly(arylene ether)/aliphatic polyamide (23–60° C.). In some embodiments the ratio of the CTE in the flow direction to the CTE perpendicular to the flow direction is 0.90 to 1.10, or, more specifically, 0.95 to 1.05.

In one embodiment, the composition has a water absorption value less than or equal to 0.3% after 24 hours, or more specifically, less than or equal to 0.25% after 24 hours, or, even more specifically less than or equal to 0.2% after 24 hours, as measured by ASTM D 570.

Impact resistance can be determined using a Notched Izod (NI) test according to ASTM D256 and a multi-axial impact test according to ASTM D3763. In one embodiment the composition has a NI value at 23° C. greater than or equal to 180 Joules per meter (J/m), or, more specifically, greater than or equal to 200, or, even more specifically, greater than or equal to 210 J/m. Additionally, the composition may have a NI at −30° C. greater than or equal to 100 J/m, or, more specifically, greater than or equal to 110 J/m, or even more specifically, greater than or equal to 120 J/m.

In one embodiment the composition has a multi-axial impact value at 23° C. greater than or equal to 30 Joules (J), or, more specifically, greater than or equal to 35, or, even more specifically, greater than or equal to 40 J. Additionally, the composition may have a multi-axial impact value at −30° C. greater than or equal to 5 J, or, more specifically, greater than or equal to 7 J, or, even more specifically, greater than or equal to 10 J. The multi-axial impact is the energy at the energy at maximum force.

In one embodiment, the composition, in the absence of filler and/or reinforcing agent, has a multi-axial loss less than or equal to 0.30, or, more specifically, less than or equal to 0.27, or, even more specifically, less than or equal to 0.25. Multi-axial loss is determined by (multi-axial value at 23° C.—multi-axial value at −30° C.)/multi-axial value at 23° C.

In another embodiment, the composition further comprising filler and/or reinforcing agent, particularly electrically conductive filler, has a multi-axial loss less than or equal to 0.60, or, more specifically, less than or equal to 0.67, or, even more specifically, less than or equal to 0.55.

As used herein, a "poly(arylene ether)" comprises a plurality of structural units of the formula (I):

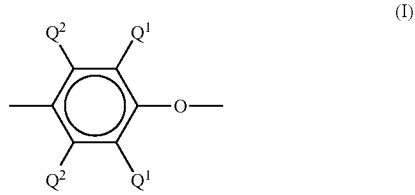

(I)

wherein for each structural unit, each $Q^1$ is independently halogen, primary or secondary lower alkyl (e.g., an alkyl containing 1 to 7 carbon atoms), phenyl, haloalkyl, aminoalkyl, alkenylalkyl, alkynylalkyl, hydrocarbonoxy, and halohydrocarbonoxy wherein at least two carbon atoms separate the halogen and oxygen atoms; and each $Q^2$ is independently hydrogen, halogen, primary or secondary lower alkyl, phenyl, haloalkyl, aminoalkyl, alkenylalkyl, alkynylalkyl, hydrocarbonoxy, halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are 4-hydroxybiphenyl end groups, typically obtained from reaction mixtures in which a by-product diphenoquinone is present.

The poly(arylene ether) may be in the form of a homopolymer; a copolymer; a graft copolymer; an ionomer; a block copolymer, for example comprising arylene ether units and blocks derived from alkenyl aromatic compounds; as well as combinations comprising at least one of the foregoing. Poly(arylene ether) includes polyphenylene ether containing 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 atomic mass units (amu) and a weight average molecular weight of 5,000 to 80,000 amu, as determined by gel permeation chromatography. The poly(arylene ether) can have an intrinsic viscosity of 0.10 to 0.60 deciliters per gram (dl/g), or, more specifically, 0.29 to 0.48 dl/g, as measured in chloroform at 25° C. It is possible to utilize a combination of high intrinsic viscosity poly(arylene ether) and a low intrinsic viscosity poly(arylene ether). Determining an exact ratio, when two intrinsic viscosities are used, will depend somewhat on the exact intrinsic viscosities of the poly(arylene ether) used and the ultimate physical properties that are desired.

The composition may contain poly(arylene ether) in an amount of 10 weight percent to 70 weight percent based on the combined weight of poly(arylene ether), polyamide and impact modifier. Within this range the amount of poly(arylene ether) may be greater than or equal to 15, or, more specifically, greater than or equal to 20 weight percent. Also within this range the amount of poly(arylene ether) may be less than or equal to 65, or, more specifically, less than or equal to 60 weight percent.

The aliphatic-aromatic polyamide comprises units derived from one or more dicarboxylic acid and units derived from one or more diamine. 60 to 100 mol % of the dicarboxylic acid units, based on the total moles of dicarboxylic acid units, are derived from terephthalic acid. Within this range the amount of terephthalic acid units may be greater than or equal to 75 mol %, or, more specifically, greater than or equal to 90 mol %. The polyamide is also known as 9T.

Examples of other dicarboxylic acid units that may be used in addition to the terephthalic acid units include units derived from aliphatic dicarboxylic acids such as malnic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'- oxydibenzoic acid, diphenylmethane-4,4'-dicarboxylic acid, diphenylsulfone-4,4'-dicarboxylic acid and 4,4'-biphenyldicarboxylic acid. These can be used singly or in combinations of two or more types. In one embodiment the content of these other dicarboxylic acid units in the dicarboxylic acid units (a) is less than or equal to 25 mol %, or, more specifically, less than or equal to 10 mol %. Units derived from polyfunctionalized carboxylic acids such as trimellitic acid, trimesic acid and pyromellitic acid may also be included to the extent that melt molding of the composition is still possible.

The aliphatic-aromatic polyamide comprises units derived from one or more diamines. 60 to 100 mol % of the diamine units, based on the total moles of diamine units, are derived from 1,9-nonanediamine units and/or 2-methyl-1,8-octanediamine units. Within this range the amount of 1,9-nonanediamine units and/or 2-methyl-1,8-octanediamine units may be greater than or equal to 75 mol %, or, more specifically, greater than or equal to 90 mol %.

The molar ratio of the 1,9-nonanediamine units to the 2-methyl-1,8-octanediamine units may be 100:0 to 20:80, or, more specifically, 100:0 to 50:50, or, even more specifically, 100:0 to 50:40. This can be referred to as the N/I ratio.

Examples of other diamine units that may be used in addition to the 1,9-nonanediamine units and/or 2-methyl-1,8-octanediamine units include units derived from linear aliphatic diamines such as 1,6-hexanediamine, 1,7-heptanediamine, 1,8-octanediamine, 1,10-decanediamine, 1,11-undecanediamine and 1,12-dodecanediamine; branched aliphatic diamines such as 2-methyl-1,5-pentanediamine, 3-methyl-1,5-pentanediamine, 2,2,4-trimethyl-1,6-hexanediamine, 2,4,4-trimethyl-1,6-hexanediamine and 5-methyl-1,9-nonanediamine; alicyclic diamines such as cyclohexanediamine, methylcyclohexanediamine, isophoronediamine, bis(4-aminocyclohexyl)methane, norbomanedimethylamine and tricyclodecanedimethylamine; and aromatic diamines such as p-phenylenediamine, m-phenylenediamine, m-xylylenediamine, p-xylylenediamine, 4,4',-diaminodiphenylsulfone and 4,4'-diaminodiphenyl ether. These can be used singly or in combinations of two or more types. In one embodiment, units derived from 1,6-hexanediamine, 1,7-heptanediamine, 1,8-octanediamine, 1,10-decanediamine and/or 1,12-dodecanediamine are combined with the 1,9-nonanediamine units and/or 2-methyl-1,8-octanediamine units.

The aliphatic-aromatic polyamide can be manufactured by any known method for manufacturing crystalline polyamides. For example, it can be manufactured by solution polymerization or interfacial polymerization in which an acid chloride and a diamine are used as raw materials, or by melt polymerization, solid-phase polymerization, or melt extrusion polymerization in which a dicarboxylic acid and a diamine are used as raw materials.

The intrinsic viscosity of the aliphatic-aromatic polyamide, measured in concentrated sulfuric acid at 30° C., may be 0.4 to 3.0 dl/g, or, more specifically, 0.5 to 2.0 dl/g, or, even more specifically, 0.6 to 1.8 dl/g.

The melt viscosity of the aliphatic-aromatic polyamide may be 300 to 3500 poise at a shear rate of 1000 s$^{-1}$ and a temperature of 330° C., as measured by capillary viscometry. Within this range, the melt viscosity may be greater than or equal to 325, or, more specifically, greater than or equal to 350 poise. Also within this range, the melt viscosity may be less than or equal to 3300, or, more specifically, less than or equal to 3100 poise.

The aliphatic-aromatic polyamide has an amine end group content greater than or equal to 45 micromoles per gram of polyamide, or more specifically, greater than or equal to 50 micromoles, or, even more specifically, greater than or equal to 55 micromoles per gram of polyamide. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution and the weight of the polyamide sample.

The compatibilized blend may additionally comprise an aliphatic polyamide such as nylon 6, 6/6, 6/69, 6/10, 6/12, 11, 12, 4/6, 6/3, 7, 8, 6T, modified 6T, polyphthalamides (PPA), and combinations of two or more of the foregoing.

The composition may contain aliphatic-aromatic polyamide in an amount of 5 weight percent to 80 weight percent based on the combined weight of poly(arylene ether), polyamide and impact modifier. Within this range the amount of aliphatic-aromatic polyamide may be greater than or equal to 10, or, more specifically, greater than or equal to 15 weight percent. Also within this range the amount of aliphatic-aromatic polyamide may be less than or equal to 70, or, more specifically, less than or equal to 60 weight percent.

The compatibilized poly(arylene ether)/aliphatic-aromatic polyamide blend is formed using a compatibilizing agent. When used herein, the expression "compatibilizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expression "compatibilized poly(arylene ether)/aliphatic-aromatic polyamide blend" refers to those compositions which have been physically and/or chemically compatibilized with a compatibilizing agent.

The compatibilizing agent comprises a polyfunctional compound that is one of two types. The first type has in the molecule both (a) a carbon-carbon double bond and b) at least one carboxylic acid, anhydride, epoxy, imide, amide, ester group or functional equivalent thereof. Examples of such polyfunctional compounds include maleic acid; maleic anhydride; fumaric acid; maleic hydrazide; dichloro maleic anhydride; and unsaturated dicarboxylic acids (e.g. acrylic acid, butenoic acid, methacrylic acid, t-ethylacrylic acid, pentenoic acid). In one embodiment, the compatibilizing agent comprises maleic anhydride and/or fumaric acid.

The second type of polyfunctional compatibilizing agent compounds are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and salts thereof. Typical of this type of compatibilizing agents are the aliphatic polycarboxylic acids, acid esters and acid amides represented by the formula:

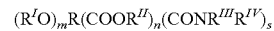

wherein R is a linear or branched chain saturated aliphatic hydrocarbon having 2 to 20, or, more specifically, 2 to t 10 carbon atoms; $R^I$ is hydrogen or an alkyl, aryl, acyl or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate and mono- and/or distearyl citrates and the like. Suitable amides useful herein include, for example, N,N'-diethyl citric acid amide; N-phenyl citric acid amide; N-dodecyl citric acid amide; N,N'-didodecyl citric acid amide and N-dodecyl malic acid. Derivates include the salts thereof, including the salts with amines and the alkali and alkaline metal salts. Exemplary suitable salts include calcium malate, calcium citrate, potassium malate, and potassium citrate.

The foregoing compatibilizing agents may be added directly to the melt blend or pre-reacted with either or both the poly(arylene ether) and polyamide. In one embodiment, at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize the poly (arylene ether). For example, the poly(arylene ether) may be pre-reacted with maleic anhydride, fumaric acid and/or citric acid to form an anhydride and/or acid functionalized polyphenylene ether which has improved compatibility with the polyamide compared to a non-functionalized polyphenylene ether.

The amount of the compatibilizing agent used will be dependent upon the specific compatibilizing agent chosen and the specific polymeric system to which it is added.

In one embodiment, the compatibilizing agent is employed in an amount of 0.05 to 2.0 weight percent, based on the combined weight of poly(arylene ether), aliphatic-aromatic polyamide, and impact modifier. Within this range the amount of compatibilizing agent may be greater than or equal to 0.1, or, more specifically, greater than or equal to 0.2 weight percent. Also within this range the amount of compatibilizing agent may be less than or equal to 1.75, or, more specifically, less than or equal to 1.5 weight percent.

The composition further comprises an impact modifier. Useful impact modifiers include block copolymers of an alkenyl aromatic compound and a conjugated diene, hydrogenated block copolymers of an alkenyl aromatic compound and a conjugated diene, functionalized elastomeric polyolefins and combinations of two or more of the foregoing.

The block copolymers are copolymers comprising (A) at least one block derived from an alkenyl aromatic compound and (B) at least one block derived from a conjugated diene. Hydrogenated block copolymers are those in which the aliphatic unsaturated group content in the block (B) is reduced by hydrogenation. The arrangement of blocks (A) and (B) includes a linear structure and a so-called radial teleblock structure having branched chains.

Exemplary structures include linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. In one embodiment the structure is a diblock, triblock, tetrablock or combination thereof, or, more specifically, an A-B diblock, an A-B-A triblock or a combination thereof.

The alkenyl aromatic compound providing the block (A) is represented by formula:

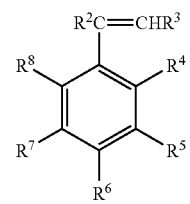

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. In one embodiment the alkenyl aromatic compound is selected from styrene, alpha-methylstyrene, p-methylstyrene, vinyltoluenes, and vinylxylenes. In another embodiment the alkenyl aromatic compound is styrene.

Specific examples of the conjugated diene include 1,3-butadiene, 2-methyl-1,3-butadiene, 2,3-dimethyl-1,3-butadiene, 1,3-pentadiene, and the like.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

There is no particular restriction on the content of the repeating unit derived from the alkenyl aromatic compound in the block copolymers. Suitable alkenyl aromatic content may be 10 to 90 weight percent based on the total weight of the block copolymer. Within this range, the alkenyl aromatic content may be greater than or equal to 40 weight percent, or, more specifically, greater than or equal to 50 weight percent, or, even more specifically, greater than or equal to 55 weight percent. Also within this range, the alkenyl aromatic content may be less than or equal to 85 weight percent, or, more specifically, less than or equal to 75 weight percent.

There is no particular limitation on the mode of incorporation of the conjugated diene in the hydrogenated block copolymer backbone. For example, when the conjugated diene is 1,3-butadiene, it may be incorporated with 1% to 99% 1,2-incorporation with the remainder being 1,4-incorporation.

The hydrogenated block copolymer may be hydrogenated to such a degree that fewer than 50%, or, more specifically fewer than 20%, or, even more specifically, fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to 25%.

The hydrogenated block copolymer may have a number average molecular weight of 5,000 to 500,000 AMU, as determined by gel permeation chromatography (GPC) using polystyrene standards. Within this range, the number average molecular weight may be at least 10,000 AMU, or more specifically greater than or equal to 30,000 AMU, or, even more specifically, greater than or equal to 45,000 AMU. Also within this range, the number average molecular weight may less than or equal to 300,000 AMU, or, more specifically less than or equal to 200,000 AMU, or, even more specifically, less than or equal to up to 150,000 AMU.

The molecular weight distribution of the hydrogenated block copolymer as measured by GPC is not particularly limited. The copolymer may have any ratio of weight average molecular weight to number average molecular weight.

Exemplary hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

Suitable hydrogenated block copolymers include those commercially available as, for example, KRATON® G1650, G1651, and G1652 available from Kraton Polymers (formerly a division of Shell Chemical Company), and TUFTEC® H1041, H1043, H1052, H1062, H1141, and H1272 available from Asahi Chemical.

Exemplary non-hydrogenated block copolymers include polystyrene-polybutadiene, polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), as well as combinations of the foregoing.

Suitable non-hydrogenated block copolymers are available commercially from a number of sources, including Phillips Petroleum under the trademark SOLPRENE, Shell Chemical Co., under the trademark KRATON, Dexco under the trademark VECTOR, and Kuraray under the trademark SEPTON.

Other useful impact modifiers include functionalized elastomeric polyolefins containing at least one functional group selected from the group consisting of carboxylic acid groups, esters, acid anhydrides, epoxy groups, oxazoline groups, carbodiimide groups, isocyanate groups, silanol groups, carboxylates, and combinations of two or more of the foregoing functional groups. The elastomeric polyolefin is a polyolefin miscible with the polyamide and includes linear random copolymers, linear block copolymer and core-shell type copolymers wherein the shell is miscible with polyamide and comprises a functional group reactive with the polyamide. Exemplary polyolefins include polyethylene, ethylene-vinyl acetate copolymer (EVA), ethylene-ethylacrylate copolymer (EEA), ethylene-octene copolymer, ethylene-propylene copolymer, ethylenebutene copolymer, ethylene-hexene copolymer, or ethylene-propylene-diene terpolymers. Monomers comprising the functional group may be graft-polymerized with the polyolefin or co-polymerized with the polyolefin monomers. In one embodiment the structural units of the elastomeric polyolefin are derived from ethylene and at least one $C_{3-8}$ olefin, such as, propylene, 1-butene, 1-hexene, and 1-octene.

Suitable functionalized elastomeric polyolefins are available commercially from a number of sources, including DuPont under the trademark ELVALOY.

The selection of the type of impact modifier or combination of types of impact modifier, may be based, at least in part, on the melt temperature of the polyamide and the temperature profile of the impact modifier.

The composition may comprise the impact modifier in an amount of 3 to 30 weight percent, based on the combined weight of poly(arylene ether), polyamide and impact modifier. Within this range the amount of impact modifier may be greater than or equal to 4, or, more specifically greater than or equal to 5 weight percent. Also within this range the amount of impact modifier may be less than or equal to 25, or, more specifically less than or equal to 20 weight percent.

The composition can be prepared melt mixing or a combination of dry blending and melt mixing. Melt mixing can be performed in single or twin screw type extruders or similar mixing devices which can apply a shear to the components.

All of the ingredients may be added initially to the processing system. In one embodiment, the poly(arylene ether), optionally other ingredients such as an impact modifier, and optionally a portion of the polyamide may be precompounded with the compatibilizing agent. In some embodiments the precompounded components may be pelletized and later combined with the remaining components of the composition. When the polyamide is added in two portions, the remaining portion of the polyamide is added after the first ingredients have been mixed. When using an extruder, the second portion of polyamide may be fed through a port downstream. While separate extruders may be used in the processing, preparations in a single extruder having multiple feed ports along its length to accommodate the addition of the various components simplifies the process. It is often advantageous to apply a vacuum to the melt through one or more vent ports in the extruder to remove volatile impurities in the composition. In some embodiments comprising an additive such as a filler or reinforcing agent it may be advantageous to introduce the additive to the other components of the composition as part of a masterbatch. For example, it is frequently useful to melt mix electrically conductive fillers with polyamide to form a conductive masterbatch and add the conductive masterbatch to the remaining components, usually downstream of the extruder feedthroat.

The composition is typically pelletized after leaving the extruder and these pellets may be subsequently formed into an article using a low shear or high shear forming processes such as injection molding, compression molding, blow molding, and profile extrusion. Once formed using a high shear or low shear forming process, the poly(arylene ether) particles have an average particle area less than or equal to 0.6 square micrometers, or, more specifically, less than or equal to 0.5 square micrometers, or, even more specifically, less than or equal to 0.4 square micrometers. This morphology may or may not be present in the pellets.

In one embodiment, the composition, once formed, has poly(arylene ether) particles dispersed in the polyamide and at least 99% of the poly(arylene ether) particles have a particle area less than or equal to 1.5 square micrometers.

Figure 2:
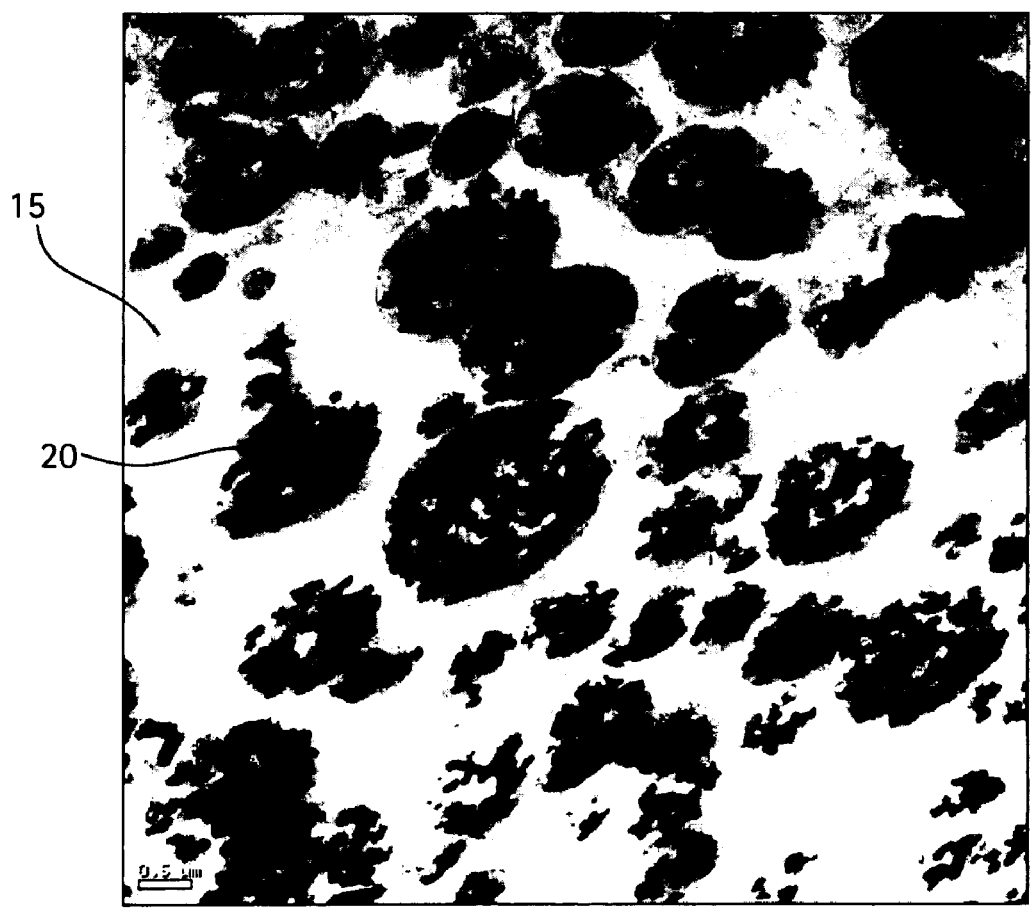
FIGS. 2–6 are transmission electron micrographs of a compositions comprising compatibilized blend of a poly (arylene ether) and an aliphatic-aromatic polyamide.

The particle area is determined by transmission electron microscopy. The composition is injection molded into ASTM tensile bars at a melt temperature of 305° C. with a mold temperature of 120 C. Samples, 2 millimeters by 2 millimeters, are removed from the middle of the bar and sections having a thickness of 100 nanometers are prepared from the sample using an ultramicrotome. Sections are taken so that either the length or height of the section, but not the thickness, is parallel to the flow direction. FIG. 1 shows a section in which the length 5 is parallel to the flow direction 10. The sections are vapor stained with freshly prepared ruthenium oxide solution for 30 seconds. Referring now to FIG. 2, the light gray areas (for example 15) correspond to polyamide and the darker areas (for example 20) correspond to poly(arylene ether). The image is calibrated with reference to the scale bar and the poly(arylene ether) particles are more distinctly delineated by accentuating the contrast. The particle size distribution is then analyzed with appropriate image analysis software such as Clemex Vision PE to determine the average particle area.

The composition may further comprise effective amounts of at least one additive selected from the group consisting of anti-oxidants; flame retardants; drip retardants; dyes; pigments; colorants; stabilizers; small particle mineral such as clay, mica, and talc; reinforcing agents such as chopped glass and glass fibers, electrically conductive filler, such as electrically conductive carbon black, carbon fibrils, carbon fibers, and carbon nanotubes; antistatic agents; plasticizers; lubricants; blowing agents; and mixtures thereof. These additives are known in the art, as are their effective levels and methods of incorporation. Effective amounts of the additives vary widely, but they are usually present in an amount up to 50% or more by weight, based on the weight of the entire composition. Some additives such as hindered phenols, thio compounds and amides derived from various fatty acids are generally present in amounts 2% total combined weight based on the total weight of the composition.

Exemplary flame retardants include halogenated flame retardants; organic phosphates including cyclic phosphates; compounds containing phosphorus-nitrogen bonds, such as phosphonitrilic chloride, phosphorus ester amides; phosphoric acid amides, phosphonic acid amides, phosphinic acid amides, tris(aziridinyl) phosphine oxide; tetrakis(hydroxymethyl) phosphonium chloride; mono-, di-, and polymeric phosphinates, magnesium hydroxide, magnesium carbonate, red phosphorus; melamine polyphosphate; melem phosphate, melam phosphate; melamine pyrophosphate; melamine; melamine cyanurate; zinc compounds such as zinc borate; and combinations comprising at least one of the foregoing. Flame retardants are typically used in amounts sufficient to provide the composition with sufficient flame retardance to pass a proscribed flame retardancy standard such as Underwriter's Laboratory Bulletin 94 entitled "Tests for Flammability of Plastic Materials, UL94". The relevant flame retardancy standard may be determined by the final application.

The following non-limiting examples further illustrate the various embodiments described herein.

EXAMPLES

The following examples were prepared using the materials listed in Table I. The examples also contain less than 1 weight percent stabilizers and anti-oxidants. The amounts shown in Tables II and III are in weight percent. Weight percent, as used in the examples, was determined based on the total weight of the composition.

TABLE I

| Material Name | Material Description/Supplier |
| --- | --- |
| PPE I | A polyphenylene ether with an intrinsic viscosity of 0.46 dl/g as measured in chloroform at 25° C. |
| PPE II | A polyphenylene ether with an intrinsic viscosity of 0.40 dl/g as measured in chloroform at 25° C. and a glass transition temperature of 205–210° C. |
| PPE III | A polyphenylene ether with an intrinsic viscosity of 0.40 dl/g as measured in chloroform at 25° C. and a glass transition temperature greater than 220° C. |
| SEBS I | Polystyrene-poly(ethylene-butylene)-polystyrene impact modifier commercially available from Kraton Polymers as G1651. |
| SEBS II | Polystyrene-poly(ethylene-butylene)-polystyrene impact modifier commercially available from Kraton Polymers as G1652. |
| SEP | Polystyrene-poly(ethylene-propylene) impact modifier commercially available from Kraton as G1701. |
| PA9T I | An aliphatic-aromatic polyamide having an amine end group content of 80 micromoles per gram of polyamide and a melt viscosity of 3000 poise at a shear rate of 1000 s$^{-1}$ and 330° C. |
| PA9T II | An aliphatic-aromatic polyamide having an amine end group content of 91 micromoles per gram of polyamide and a melt viscosity of 350 poise at a shear rate of 1000 s$^{-1}$ and 330° C. |
| PA9T III | An aliphatic-aromatic polyamide having an amine end group content of 10–20 micromoles per gram of polyamide and a melt viscosity of 350 poise at a shear rate of 1000 s$^{-1}$ and 330° C. |
| PA9T IV | An aliphatic-aromatic polyamide having an amine end group content of 77 micromoles per gram of polyamide and a melt viscosity of 2000 poise at a shear rate of 1000 s$^{-1}$ and 330° C. |
| PA9T V | An aliphatic-aromatic polyamide having an amine end group content of 80 micromoles per gram of polyamide and a melt viscosity of 2100 poise at a shear rate of 1000 s$^{-1}$ and 310° C. |
| PA 6,6 | An aliphatic polyamide commercially available from Solutia as Vydyne 21Z. |
| PA 6 | An aliphatic polyamide commercially available from Rhodia as Technyl ASN 27/32–35 LC. |
| Citric acid | Available from Cargill |
| Fumaric acid | Available from Asland Chemical |
| Maleic anhydride | Available from Huntsman |
| CCB | Electrically conductive carbon black commercially available as Ketjen EC600JD from Azko Nobel. |

The examples were tested for impact strength using ASTM D256 (Notched Izod, NI) and ASTM D3763 (Multi-axial impact, MAI) at 23° C. and −30° C. Notched Izod values are reported in Joules per meters. Multi-axial impact values are reported in Joules. Melt viscosity of the PA9T was determined by capillary viscometry. Multi-axial loss was determined by (Multi-axial value at 23° C.—Multi-axial value at −30° C.)/Multi-axial value at 23° C. Moisture absorption and coefficient of thermal expansion (CTE) were determined as described above. CTE values are reported in millimeters/millimeters° C. and moisture absorption values are in %. Average particle area was determined as described above. Transmission electron microscopy or scanning electron microscopy was used to determine if the phases were dispersed or co-continuous.

Examples 1–15

Poly(arylene ether), impact modifier, and either citric acid, fumaric acid or maleic anhydride (as shown in Table II) were added at the feed throat of a 30 millimeter Werner and Pfleider twin screw extruder and melt mixed at a screw speed of 350 rotations per minute and a feed rate of 13.6 kilograms per hour and a temperature of 305° C. The polyamide was added downstream. The material was pelletized and formed by injection molding the pellets and tested for Notched Izod impact strength, and multi axial impact strength. The morphology was examined by electron microscopy and visual determinations were made with regard to the relationship of the poly(arylene ether) phase to the polyamide phase (co-continuous or dispersed) as well as poly(arylene ether) particle size. Formulations and results are shown in Table II.

Examples 1–3, demonstrate that a composition comprising a compatibilized poly(arylene ether)/aliphatic polyamide blend with good physical properties and small poly(arylene ether) particle size can be made using a range of compatibilizing agents and the type of compatibilizing agent has little impact on the morphology and physical properties of the composition.

Examples 4–6 demonstrate that compositions made using an aliphatic-aromatic polyamide having low amine end group content have poor physical properties. The compositions, once formed by injection molding, demonstrated delamination.

Examples 7–10 employ a high melt viscosity aliphatic-aromatic polyamide. Notably, Examples 7 and 9 employ citric acid as a compatibilizer and have a co-continuous morphology while Examples 8 and 10 employ fumaric acid as a compatibilizer and have a dispersed morphology. The importance of the morphology can be seen in the impact data, particularly the low temperature impact data where the comparable fumaric acid compatibilized examples have an impact strength that is at least 30% better that the citric acid

TABLE II

| Component | 1* | 2* | 3* | 4* | 5* | 6* | 7* | 8 | 9* | 10 | 11 | 12 | 13 | 14 | 15 |
|---|---|---|---|---|---|---|---|---|---|---|---|---|---|---|---|
| PPE I | 38.6 | 38.6 | 38.6 | 38.6 | 38.6 | 38.6 | 38.6 | 38.6 | 42.4 | 42.4 | 38.6 | 38.6 | 38.6 | 46.3 | 46.3 |
| PA9T I | — | — | — | — | — | — | 50 | 50 | 45 | 45 | — | — | — | — | — |
| PA9T II | — | — | — | — | — | — | — | — | — | — | 50 | 50 | 50 | 40 | 40 |
| PA9T III | — | — | — | 50 | 50 | 50 | — | — | — | — | — | — | — | — | — |
| PA6,6 | 50 | 50 | 50 | — | — | — | — | — | — | — | — | — | — | — | — |
| SEBS I | 10 | 10 | 10 | 10 | 10 | 10 | 10 | 10 | 11 | 11 | 10 | 10 | 10 | 12 | 12 |
| Citric Acid | 1.1 | — | — | 1.1 | — | — | 1.1 | — | 1.21 | — | 1.1 | — | — | 1.32 | — |
| Fumaric Acid | — | 0.5 | — | — | 0.5 | — | — | 0.5 | — | 0.55 | — | 0.5 | — | — | 0.6 |
| Maleic Anhydride | — | — | 0.3 | — | — | 0.3 | — | — | — | — | — | — | 0.3 | — | — |
| Notched Izod: 23° C. | 502 | 579 | 565 | 69.4 | 75.6 | 66.2 | 669 | 759 | 764 | 773 | 223 | 255 | 260 | 181 | 297 |
| Notched Izod: −30° C. | 143 | 153 | 136 | 58.4 | 54.2 | 51.8 | 161 | 216 | 198 | 260 | 159 | 173 | 167 | 114 | 209 |
| Multi-Axial Impact: 23° C. | 61.3 | 60.1 | 58.6 | 4.6 | 5.4 | 6.2 | 56.2 | 63.7 | 62.6 | 59.7 | 51.7 | 59.8 | 55.4 | 21.4 | 49.5 |
| Multi-Axial Impact: −30° C. | 35.0 | 40.7 | 38.4 | 3.1 | 3.1 | 3.4 | 10.7 | 61.8 | 6.7 | — | 21.6 | 44.5 | 43.2 | 8.1 | 47.5 |
| Multi-Axial Imact loss | 0.43 | 0.32 | 0.34 | 0.32 | 0.43 | 0.45 | 0.80 | 0.03 | 0.89 | — | 0.58 | 0.25 | 0.22 | 0.62 | 0.04 |
| PPE phase/PA phase** | D | D | D | D | D | D | C | D | C | D | D | D | D | D | D |
| Average particle area*** | — | — | — | — | — | — | — | — | — | — | 0.722 | 0.354 | — | — | — |
| Moisture Absorption | 0.4 | 0.4 | — | — | — | — | .19 | .19 | — | — | .19 | .19 | — | — | — |
| CTE (×10⁻⁵) - Flow Direction | 10.2 | 10.3 | — | — | — | — | 8.4 | 8.3 | — | — | 8.5 | 8.0 | — | — | — |
| CTE (×10⁻⁵) - Cross Flow Direction | 10.1 | 10.2 | — | — | — | — | 8.2 | 8.2 | — | — | 7.9 | 8.0 | — | — | — |

*Comparative Example
**D = dispersed;
C = co-continuous
***In square micrometers compatibilized examples. Additionally, the fumaric acid compatibilized examples show a multi-axial impact loss that is significantly lower than the multi-axial impact loss of the citric acid compatibilized examples.

Examples 11–15 employ a low melt viscosity aliphatic-aromatic polyamide. A comparison of the multi-axial impact loss for the examples using different compatibilizers surprisingly shows that the choice of compatibilizer has a significant impact on multi-axial impact loss and can decrease multi-axial impact loss by 50% or more. This is more surprising because a similar phenomenon is not seen in Examples 1–3, which were made using an aliphatic polyamide.

Figure 3:
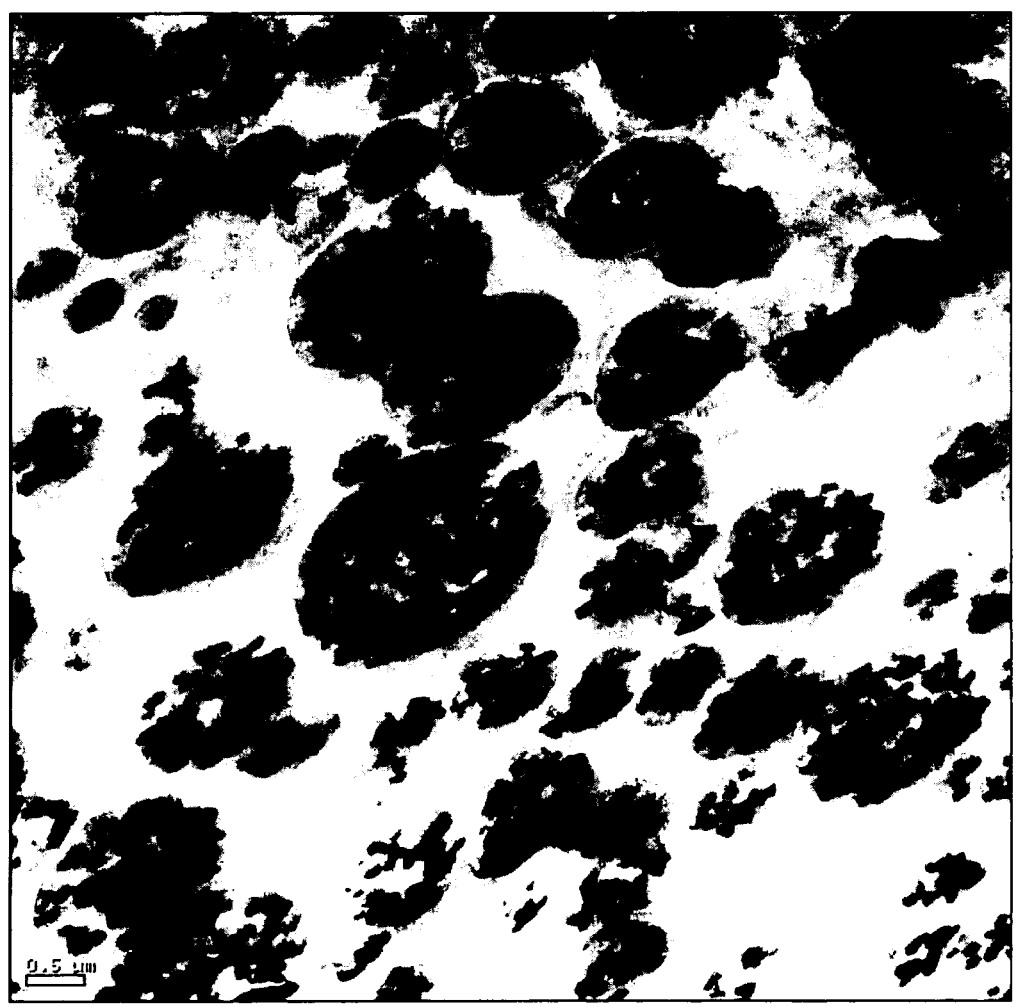
Figure 4:
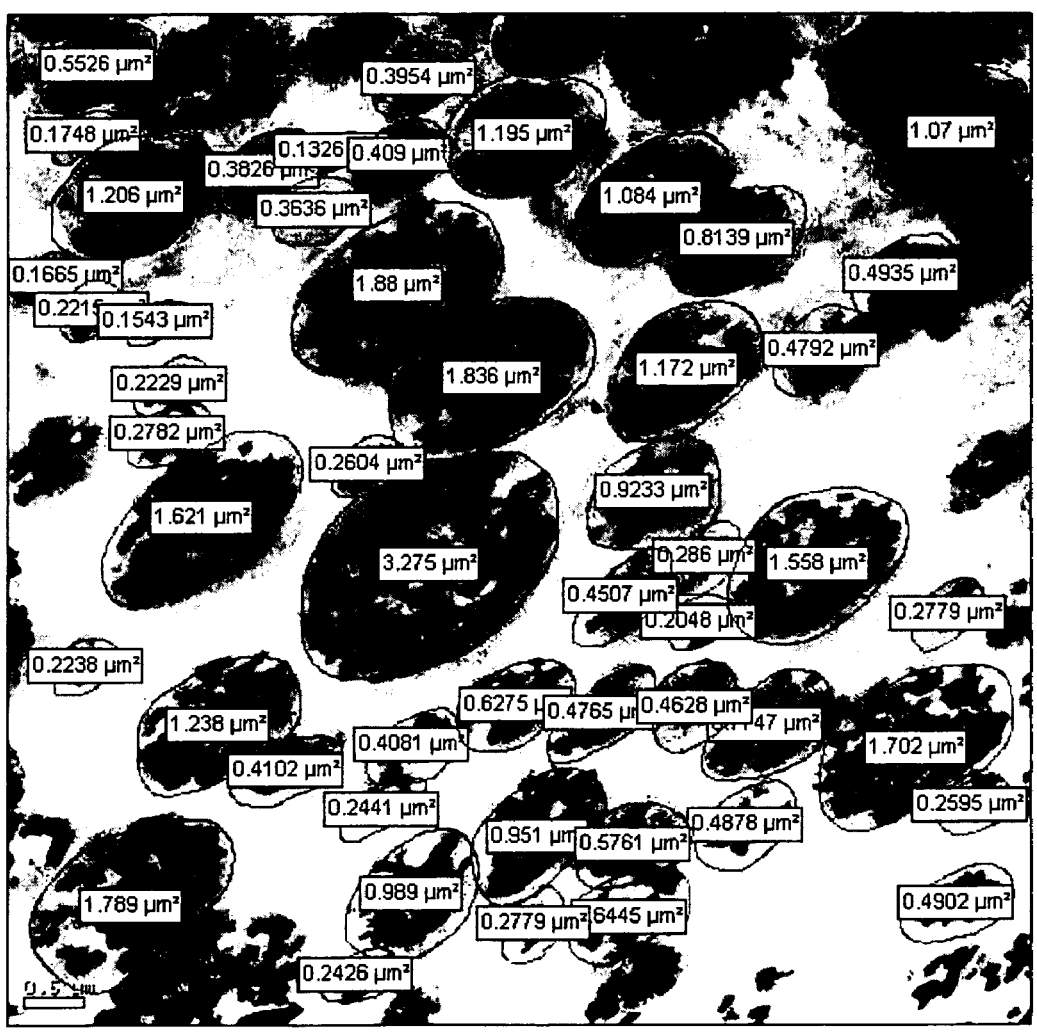
Figure 5:
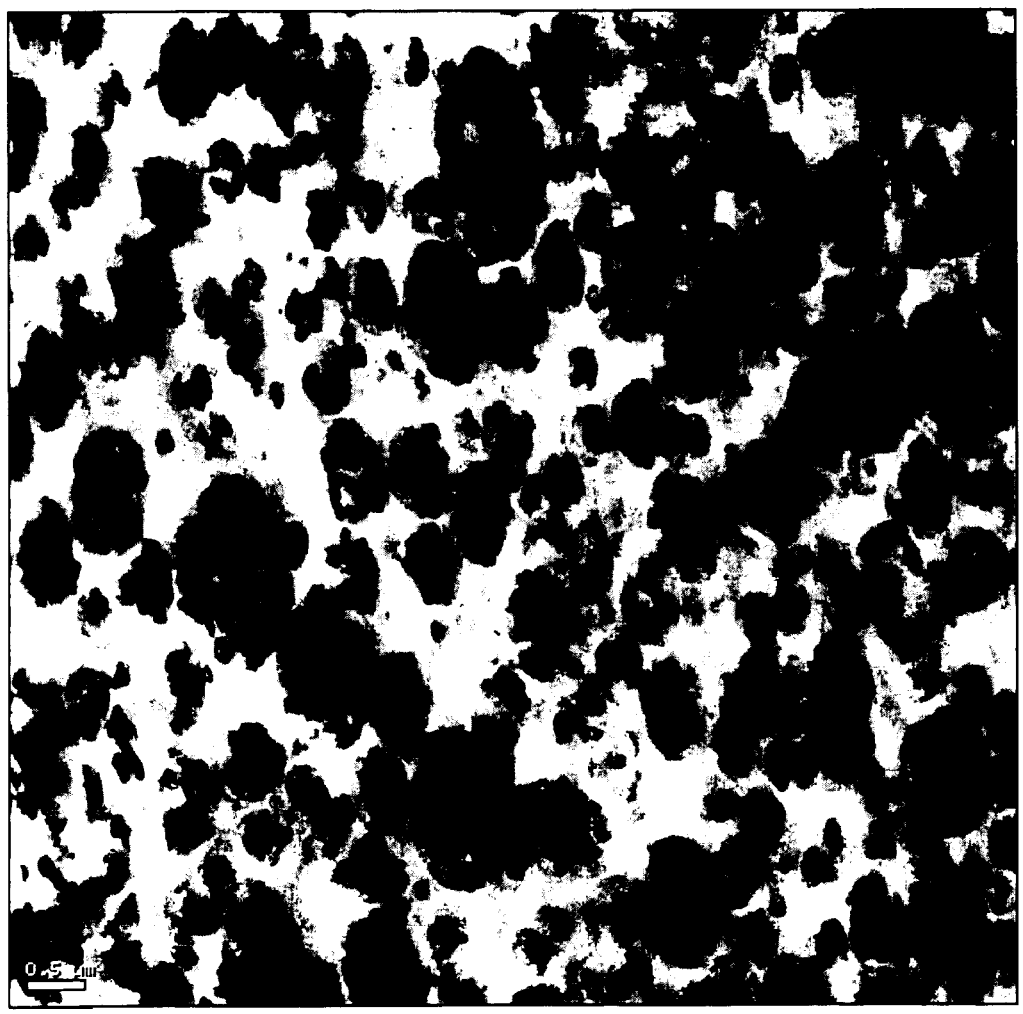
Figure 6:
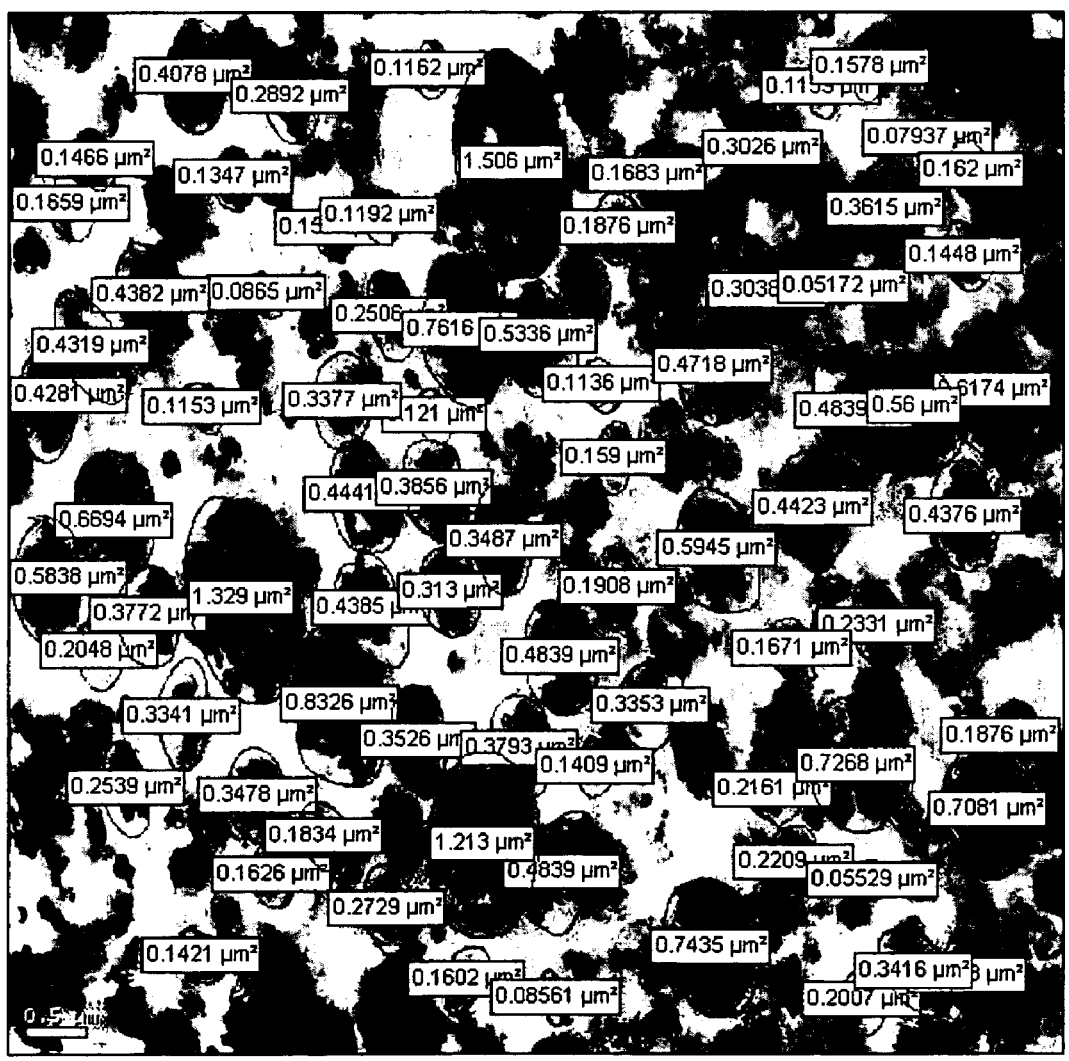
Figure 7:
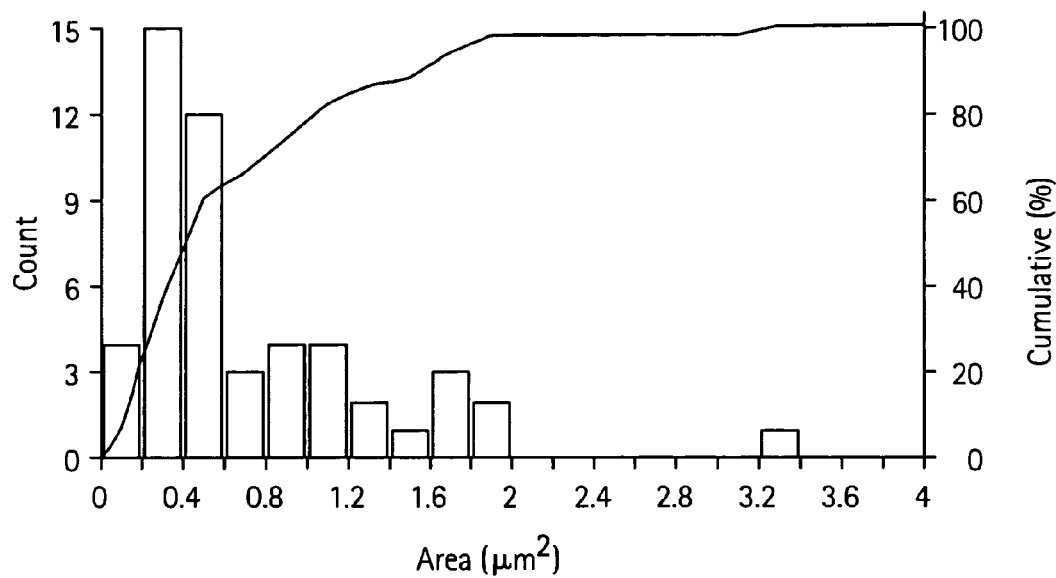
FIGS. 7 and 8 are graphs depicting particle area distribution.
Figure 8:
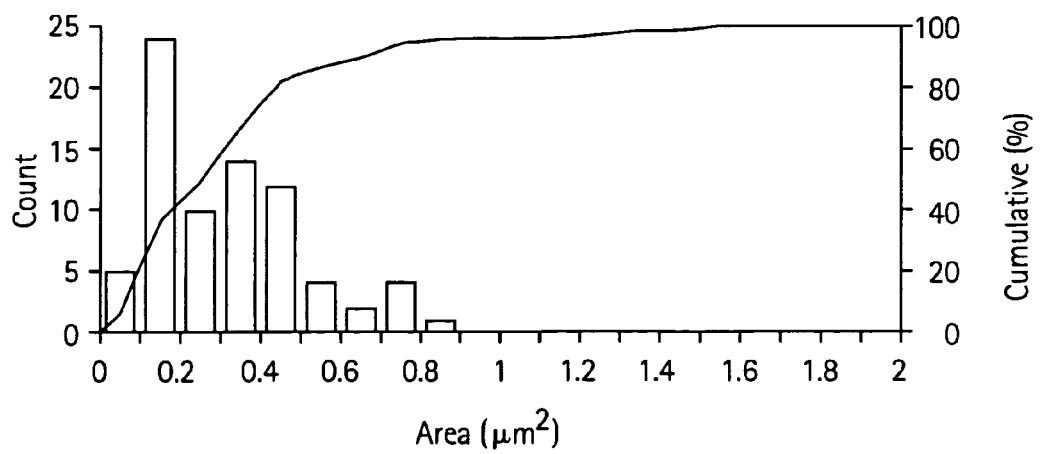

The interdependence of compatibilizer, morphology and physical properties is further shown by a comparison of Examples 11 and 12. Example 11 employed citric acid as the compatibilizer whereas Example 12 employed fumaric acid. The morphology of Example 11 is demonstrated by the transmission electron micrograph shown in FIG. 3 and 4. FIG. 4 is the micrograph shown in FIG. 3 after image analysis. The morphology of Example 12 is demonstrated by the transmission electron micrograph shown in FIG. 5 and 6. FIG. 6 is the micrograph shown in FIG. 5 after image analysis. A summary of the image analysis of FIGS. 4 and 6 is shown in Table III. All particle areas are in square micrometers. The total area analyzed was 77.9 square micrometers. FIG. 7 is a graph showing the particle area distribution of Example 11. FIG. 8 is a graph showing the particle area distribution of Example 12.

TABLE III

|  | Example 11 | Example 12 |
| --- | --- | --- |
| Minimum particle area counted | 0.1 | 0.05 |
| Maximum particle area counted | 3.3 | 1.5 |
| Mean particle area | 0.7 | 0.35 |
| Standard deviation | 0.6 | 0.27 |
| Sum of all particle areas | 36.8 | 27.9 |
| Number of particles counted | 51 | 79 |

Example 11 has a mean particle area greater than 0.6 square micrometers and shows a multi-axial impact loss more than twice that of Example 12 which has a mean particle area less than 0.6 square micrometers. Additionally, greater than or equal to 99% of the particles in Example 12 have a particle area less than or equal to 1.5 square micrometers.

Example 16

A composition was made using the formulation of Example 11 but the poly(arylene ether) was melt mixed with the citric acid to produce a modified poly(arylene ether) and then pelletized. The pelletized modified poly(arylene ether) was then added to the feedthroat with the remaining components and melt mixed. When the morphology of an injection molded specimen was examined it was found that the poly(arylene ether) particles were markedly reduced in size and greater than 99% of the particles had a particle area less than or equal to 1.5 square micrometers.

Examples 17–20

Poly(arylene ether), impact modifier, and either citric acid or fumaric acid (as shown in Table IV) were added at the feed throat of a 28 millimeter Werner and Pfleider twin screw extruder and melt mixed at a screw speed of 300 rotations per minute and a feed rate of 10 kilograms per hour and a temperature of 310° C. This extruder has 2 downstream feed locations. The polyamide was added to the extruder at the first down stream location and 1.8 weight percent electrically conductive carbon black was added at the second downstream feed location. The material was pelletized and formed by injection molding the pellets and tested for Notched Izod impact strength and multi axial impact strength. Results are shown in Table IV.

TABLE IV

| Component | 17* | 18* | 19 | 20 |
| --- | --- | --- | --- | --- |
| PPE II | 34.09 | — | 34.29 | — |
| PPE III | — | 35 | — | 35.2 |
| PA9T IV | — | — | — | 48 |
| PA9T V | — | — | 48 | 50 |
| PA 6 | 10 | 10 | — | — |
| PA6,6 | 38 | 38 | 50 | — |
| SEBS II | 7 | 7 | 7 | 7 |
| SEP | 8 | 7 | 8 | 7 |
| Citric Acid | 0.7 | 0.7 | — | — |
| Fumaric Acid | — | — | 0.5 | 0.5 |
| Notched Izod: 23° C. | 19 | 17 | 26 | 15 |
| Notched Izod: −30° C. | 11 | 9 | 8 | 8 |
| Multi-Axial Impact: 23° C. | 62.8 | 54.3 | 57.96 | 38.9 |
| Multi-Axial Impact: −30° C. | 5.12 | 0.32 | 26.88 | 17.9 |
| Multi-Axial Impact loss | 0.92 | 0.93 | 0.53 | 0.53 |

*Comparative Example

Examples 19 and 20, when compared to Examples 17 and 18 respectively, demonstrate that compositions comprising a compatibilized blend of a poly(arylene ether)/aliphatic-aromatic polyamide and an electrically conductive filler demonstrate lower multi-axial impact loss than comparable compositions comprising a compatibilized blend of a poly(arylene ether)/aliphatic polyamide.

While the invention has been described with reference to various embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents are incorporated by reference herein.

The invention claimed is:

1. A composition comprising:
    an impact modifier; and
    a compatibilized blend of a poly(arylene ether) and an aliphatic-aromatic polyamide wherein, prior to forming the compatibilized blend, the aliphatic-aromatic polyamide has an amine end group content greater than 45 micromoles per gram of polyamide and the aliphatic-aromatic polyamide comprises
    units derived from a dicarboxylic acid wherein 60 to 100 mol % of the units derived from a dicarboxylic acid are derived from terephthalic acid and
    units derived from a diamine wherein 60 to 100 mol % of the units derived from a diamine are derived from 1,9-nonanediamine, 2-methyl-1,8-octanediamine units or a combination of 1,9-nonanediamine and 2-methyl-1,8-octanediamine
    and further wherein when the composition is formed, the poly(arylene ether) is dispersed in the polyamide as particles and the poly(arylene ether) particles have an average particle area less than or equal to 0.6 square micrometers and further wherein the composition, in the absence of filler and/or reinforcing agent, has a multi-axial loss less than or equal to 0.27, determined using multi-axial impact values measured according to ASTM D3763.

2. The composition of claim 1 wherein the composition has a coefficient of thermal expansion of $6\times10^{-5}$ millimeters/millimeters ° C. to $9\times10^{-5}$ millimeters/millimeters ° C. as determined by ISO 11359-2 and reported at 23–60° C.

3. The composition of claim 1 wherein the composition has a coefficient of thermal expansion in the flow direction and a coefficient of thermal expansion perpendicular to the flow direction and the ratio of the coefficient of thermal expansion in the flow direction to the coefficient of thermal expansion perpendicular to the flow direction is 0.90 to 1.05 in the absence of filler.

4. The composition of claim 1 wherein the composition has a water absorption value less than or equal to 0.3% after 24 hours as determined by ASTM D 570.

5. The composition of claim 1 wherein the composition has a Notched Izod value at 23° C. greater than or equal to 180 Joules per meter, as measured by ASTM D 256.

6. The composition of claim 1 wherein the composition has a multi-axial impact value at 23° C. greater than or equal to 30 Joules, as measured by ASTM D 3763.

7. The composition of claim 1, wherein the poly(arylene ether) is present in an amount of 10 to 70 weight percent, the aliphatic-aromatic polyamide is present in an amount of 5 to 80 weight percent, based on the combined weight of poly (arylene ether), aliphatic-aromatic polyamide and impact modifier.

8. The composition of claim 1, wherein the molar ratio of 1,8-nonanediamine to 2-methyl-1,8-octanediamine is 100:0 to 20:80.

9. The composition of claim 1, wherein the amine end group content is greater than or equal to 50 micromoles.

10. The composition of claim 1, wherein the aliphatic-aromatic polyamide has an intrinsic viscosity of 0.4 to 3.0 dl/g when measured in concentrated sulfuric acid.

11. The composition of claim 1, wherein the aliphatic-aromatic polyamide has a melt viscosity of 300 to 3500 poise at a shear rate of $1000\ s^{-1}$ and a temperature of 330° C., as measured by capillary viscometry.

12. The composition of claim 1, wherein the compatibilized blend of a poly(arylene ether) and an aliphatic-aromatic polyamide further comprises an aliphatic polyamide.

13. The composition of claim 1, wherein the compatibilized blend of poly(arylene ether) and an aliphatic-aromatic polyamide is the reaction product of a poly(arylene ether), an aliphatic-aromatic polyamide, and a compatibilizing agent selected from polyfunctional compounds having both a carbon-carbon double bond and at least one carboxylic acid, anhydride, epoxy, imide, amide, ester group or functional equivalent thereof; polyfunctional compounds having both a group represented by the formula (OR) wherein R is hydrogen or an alkyl, aryl, acyl or carbonyl dioxy group and at least two groups each of which may be the same or different selected from carboxylic acid, acid halide, anhydride, acid halide anhydride, ester, orthoester, amide, imido, amino, and salts thereof; and combinations of two or more of the foregoing polyfunctional compounds.

14. The composition of claim 13, wherein the compatibilizing agent comprises citric acid, fumaric acid, maleic anhydride or a combination of two or more of the foregoing.

15. The composition of claim 1, wherein the impact modifier comprises a block copolymer of an alkenyl aromatic compound and a conjugated diene, a hydrogenated block copolymer of an alkenyl aromatic compound and a conjugated diene, a functionalized elastomeric polyolefin or a combination of two or more of the foregoing.

16. The composition of claim 1, wherein the impact modifier is present in an amount of 3 to 30 weight percent, based on the combined weight of poly(arylene ether), aliphatic-aromatic polyamide and impact modifier.

17. The composition of claim 1, wherein the poly(arylene ether) particles have an average particle area less than or equal to 0.5 square micrometers.

18. The composition of claim 1, wherein the poly(arylene ether) particles have an average particle area less than or equal to 0.4 square micrometers.

19. The composition of claim 1, further comprising an anti-oxidant, flame retardant, drip retardant, dye, pigment, colorant, stabilizer, antistatic agent, plasticizer, lubricant, blowing agent or a mixtures comprising two or more of the foregoing.

20. A composition comprising:

an impact modifier;

a filler and/or reinforcing agent; and a compatibilized blend of a poly(arylene ether) and an aliphatic-aromatic polyamide wherein, prior to forming the compatibilized blend, the aliphatic-aromatic polyamide has an amine end group content greater than 45 micromoles per gram of polyamide and the aliphatic-aromatic polyamide comprises units derived from a dicarboxylic acid wherein 60 to 100 mol % of units derived from a dicarboxylic acid are derived from terephthalic acid and units derived from a diamine wherien 60 to 100 mol % of the units derived form a diamine are derived from 1,9-nonanediamine, 2-methyl-1,8-octanediamine, or a combination of 1,9-nonanediamine and 2-methyl-1,8-octanediamine and wherein the composition, in the presence of filler and/or reinforcing agent, has a multi-axial loss less than or equal to 0.60 determined using multi-axial values measured according to ASTM D 3763.

21. The composition of claim 20, wherein the filler is an electrically conductive filler.

22. A composition comprising:

an impact modifier;

a filler and/or reinforcing agent; and a compatibilized blend of a poly(arylene ether) and an aliphatic-aromatic polyamide wherein, prior to forming the compatibilized blend, the aliphatic-aromatic polyamide has an amine end group content greater than 45 micromoles per gram of polyamide and the aliphatic-aromatic polyamide comprises units derived from a dicarboxylic acid units wherein 60 to 100 mol % of units derived from a dicarboxylic acid are derived from terephthalic acid and units derived from a diamine wherein 60 to 100 mol % of the units derived from a diamine are derived from 1,9-nonanediamine, 2-methyl-1,8-octanediamine or a combination of 1.9-nonanediamine and 2-methyl-1,8-octanediamine and wherein the composition, once formed, comprises poly(arylene ether) particles dispersed in polyamide and at least 99% of the poly(arylene ether) particles have a particle area less than or equal to 1.5 square micrometers the composition and further wherein, in the presence of filler and/or reinforcing agent, has a multi-axial loss less than or equal to 0.60, determined using multi-axial impact values measured according to ASTM D3763.

* * * * *

UNITED STATES PATENT AND TRADEMARK OFFICE
CERTIFICATE OF CORRECTION

PATENT NO. : 7,182,886 B2
APPLICATION NO. : 10/903362
DATED : February 27, 2007
INVENTOR(S) : Mark Elkovitch et al.

It is certified that error appears in the above-identified patent and that said Letters Patent is hereby corrected as shown below:

Column 5:
Lines 35-36, after "bis(4-aminocyclohexyl)methane", delete "norbomanedimethylamine" and insert therefor --norbornanedimethylamine--;

Column 13 and 14:
Table 2, delete "Multi-Axial Imact Loss" and insert therefor --Multi-Axial Impact Loss--;

Column 17:
Line 32, after "weight", delete "ofpoly" and insert therefor --of poly--;
Line 45, after "temperature", delete "of330" and insert therefor --of 330--.

Signed and Sealed this

Seventeenth Day of July, 2007

JON W. DUDAS
*Director of the United States Patent and Trademark Office*